US009462432B2

(12) United States Patent
Jeon et al.

(10) Patent No.: US 9,462,432 B2
(45) Date of Patent: Oct. 4, 2016

(54) INSTANT MESSAGE TRANSMITTING AND RECEIVING SYSTEM, TERMINAL DEVICE AND CONTROLLING METHOD THEREOF

(71) Applicant: Samsung Electronics Co., Ltd., Gyeonggi-do (KR)

(72) Inventors: Byung Wuk Jeon, Gyeonggi-do (KR); Myoung Jin Ji, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/294,430

(22) Filed: Jun. 3, 2014

(65) Prior Publication Data

US 2015/0099491 A1 Apr. 9, 2015

(30) Foreign Application Priority Data

Oct. 4, 2013 (KR) ........................ 10-2013-0118356

(51) Int. Cl.
H04W 4/12 (2009.01)
H04M 1/725 (2006.01)
H04L 29/06 (2006.01)
H04L 12/58 (2006.01)
H04W 88/02 (2009.01)

(52) U.S. Cl.
CPC ................ *H04W 4/12* (2013.01); *H04L 51/04* (2013.01); *H04L 51/18* (2013.01); *H04L 69/22* (2013.01); *H04M 1/72552* (2013.01); *H04M 1/725* (2013.01); *H04W 88/02* (2013.01)

(58) Field of Classification Search
CPC ..... H04W 4/12; H04W 88/02; H04M 1/725; H04M 1/72552
See application file for complete search history.

(56) References Cited

U.S. PATENT DOCUMENTS

| 2003/0157946 A1* | 8/2003 | Chong ............ H04M 1/274516 455/466 |
| 2006/0063541 A1* | 3/2006 | Ryu ................. H04M 3/42382 455/466 |
| 2006/0116142 A1* | 6/2006 | Cofta .................... H04L 12/587 455/466 |
| 2007/0198348 A1* | 8/2007 | Tung .................. G06Q 30/0265 705/14.62 |

FOREIGN PATENT DOCUMENTS

| KR | 10-2006-0026170 A | 3/2006 |
| KR | 10-0679076 B1 | 2/2007 |
| KR | 10-2007-0044729 A | 4/2007 |

OTHER PUBLICATIONS

RFC 3261 SIP (Jun. 2002).*
3GPP TS23.040 V12.1.0 (Sep. 2013).*

* cited by examiner

*Primary Examiner* — William Nealon
(74) *Attorney, Agent, or Firm* — Cha & Reiter, LLC

(57) ABSTRACT

A terminal device includes a message generation unit configured to generate an instant message according to a user command and a communication unit configured to transmit the instant message to another terminal device. A header of the instant message includes a field in which is inserted display identification information indicating whether or not to display the instant message on a display screen.

18 Claims, 19 Drawing Sheets

INSTANT MESSAGE TRANSMITTING AND RECEIVING SYSTEM, TERMINAL DEVICE AND CONTROLLING METHOD THEREOF

CROSS-REFERENCE TO RELATED APPLICATION

Applicant claims priority from Korean patent application No. 10-2013-0118356 filed Oct. 4, 2013, the disclosure of which is hereby incorporated by reference in its entirety.

BACKGROUND

1. Technical Field

The present disclosure relates to a terminal device enabling instant message transmission/reception between users, and a method for controlling the same.

2. Description of the Related Art

In light of recent advances in electronic technology and communication networks, various devices and methods for communication between users are now being developed. Accordingly, users are able to communicate with each other through electronic mail, wireless telephony, instant messaging, Internet chatting, and video calling in addition to wired telephony.

With regard to the aforementioned methods of communication, electronic mail service may be limited in terms of real time communication because of the inherent uncertainty as to when or even whether a receiver will check his/her mail. In addition, telephone or video calling may involve constraints in terms of time and place—e.g., there may be limits to calling late at night or reaching someone at an office. Internet chatting may be used only when a chat partner accesses a chat website. However, communication via an instant message service allows users to send/receive messages and communicate freely without limitations in terms of time and place.

"Instant message service" denotes a service that enables real-time message transmission/reception. When an instant message is transmitted by a transmitter, the message is instantly received by a receiver who checks the message, thereby enabling real-time communication like Internet chatting or telephone calls. Furthermore, instant message service enables the real-time transmission of data such as music, videos, and pictures. Due to such advantages, instant message service is increasingly being used and becoming more widespread than ever.

SUMMARY

According to an embodiment of the present invention, a terminal device includes: a message generation unit configured to generate an instant message according to a user command; and a communication unit configured to transmit the instant message to another terminal device, wherein a header of the instant message includes a field into which display identification information indicating whether to display the instant message on a display screen is inserted.

Here, when a cancellation command for a previously transmitted instant message is input from a user, the message generation unit may insert message cancellation information into the field.

Furthermore, the instant message may include in the header information other than the content of the instant message.

Furthermore, when a restoration command for the instant message for which a cancellation command has been input is input from a user, the message generation unit may insert message display information into the field.

The terminal device may further include a storage unit comprising non-transitory storage configured to map the content of the instant message to the display identification information to store the content of the instant message and the display identification information.

Here, when the cancellation command for the previously transmitted instant message is input from the user, the storage unit may be updated the display identification information on the instant message for which the cancellation command is input with the message cancellation information.

Furthermore, when the restoration command is input by the user for the instant message in which the cancellation command has been previously input, the storage unit may update the display identification information on the instant message for which the restoration command is input with the message display information.

The terminal device may further include a display unit configured to display the stored content of the instant message on a display screen according to the stored display identification information.

The storage unit may be configured to map the content of the instant message, the display identification information, and a control authority on the instant message to each other to store the content of the instant message, the display identification information, and the control authority.

The terminal device may further include a control unit configured to limit input of a cancellation command or a restoration command for the instant message according to the control authority on the instant message.

According to another embodiment of the present invention, a method for controlling a terminal device includes: generating an instant message having a header including display identification information indicating whether to display the instant message on a display screen; and transmitting the instant message to another terminal device.

The method may further include: displaying a content of the instant message on the display screen according to the display identification information; and deleting, from the display screen, the content of the instant message being displayed when a cancellation command for the instant message is input.

The method may further include displaying the content of the deleted instant message when a restoration command has been input for the instant message of which the cancellation command has been previously input.

The method may further include: displaying a content of the instant message on the display screen according to the display identification information; deleting, from the display screen, the content of the instant message and displaying an object indicating that the instant message is being requested to be cancelled when a cancellation command for the instant message is input; and deleting the object from the display screen when response information indicating message cancellation is received from the other terminal device.

The method may further include: displaying a content of the instant message on the display screen according to the display identification information; and deleting, from the display screen, the content of the instant message and displaying an object indicating that the instant message has been cancelled when a cancellation command for the instant message is input.

The method may further include: limiting input of a cancellation command for the instant message when at least one event occurs, wherein the at least one event includes a lapse of a preset time after transmitting the instant message and a lapse of the preset time after a user of the other terminal device checks the instant message.

The method may further include: displaying the instant message on a display screen according to the display identification information; and continuously changing at least one of a shape, color, and transparency of the instant message displayed on the display screen until at least one of events occurs, wherein the events include a lapse of a preset time after transmitting the instant message and a lapse of the preset time after a user of the other terminal device checks the instant message.

The method may further include: receiving, from the other terminal device, an instant message having a header into which display identification information is inserted; and displaying a content of the instant message on a display screen according to the display identification information.

The method may further include deleting/removing, from the display screen, the content of the instant message when a cancellation message for the received instant message is received from the other terminal device.

The method may further include displaying, on the display screen, the content of the deleted instant message when a restoration message for the instant message for which the cancellation message has been received is input from the other terminal device.

The method may further include displaying an object indicating that the instant message has been cancelled, when a cancellation message for the received instant message is received from the other terminal device.

The method may further include limiting an input of a user command for at least one of copying, amending, forwarding, and deleting of the received instant message until at least one of events occurs when the instant message is received from the other terminal device, wherein the events include a lapse of a preset time after transmitting the instant message from the other terminal device and a lapse of the preset time after a user checks the instant message.

The method may further include continuously changing display of at least one of a shape, color, and transparency of the instant message displayed on the display screen until at least one event occurs, wherein the at least one event includes a lapse of a preset time after transmitting the instant message from the other terminal device and a lapse of the preset time after a user checks the instant message.

The method may further include: receiving, from the other terminal device, an instant message having a header into which display identification information is inserted; mapping a content of the received instant message to the display identification information to store the content of the received instant content and the display identification information; and displaying on the display screen the stored content of the instant message according to the stored display identification information.

The method may further include updating the stored display identification information with display identification information inserted into a header of the cancellation message or the restoration message, when a cancellation message or a restoration message for the received instant message is received from the other terminal device.

According to another embodiment of the present invention, an instant message transmitting/receiving system includes: a first terminal device configured to generate an instant message and transmit the instant message to a second terminal device, the instant message having a header including display identification information indicating to the second terminal device whether to display the instant message on a display screen; and the second terminal device configured to receive, from the first terminal device, the instant message and display a content of the instant message on the display screen according to the display identification information.

BRIEF DESCRIPTION OF THE DRAWINGS

The accompanying drawings, which have been provided for purposes of illustration and do not limit any aspect of the appended claims to the illustrations shown herein, include:

FIG. 6(b) shows updated display identification information;

A person of ordinary skill in the art should understand and appreciate that any particular configuration or flowchart provided herein for illustrative purposes does not limit the appended claims to the illustrations shown and described.

DETAILED DESCRIPTION

Hereinafter the present invention will be described in detail with reference to the accompanying drawings.

Figure 1:
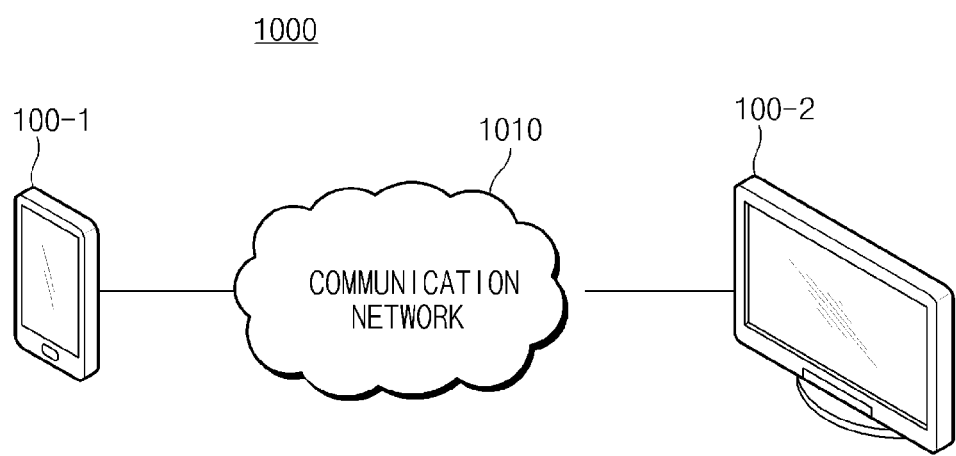
FIG. 1 is a schematic view of an instant message transmitting/receiving system according to an embodiment of the present invention.

FIG. 1 is a schematic view of an instant message transmitting/receiving system according to an embodiment of the present invention.

As illustrated in FIG. 1, an instant message transmitting/receiving system 1000 according to an embodiment of the present invention includes a plurality of terminal devices 100-1 and 100-2 connected to each other through a communication network. The plurality of terminal devices 100-1 and 100-2 may be implemented with a device capable of transmitting an instant message through the communication network, via wireless (or even wired) communication such as a TV, a cell phone, a smartphone, a PDA, a laptop computer, a desktop computer, and a tablet PC. FIG. 1 illustrates the case where a first terminal device 100-1 is implemented with a smartphone and a second terminal device 100-2 is implemented with a TV.

The communication network represents a wired/wireless Internet communication network that connects a network around the world using a transmission control protocol/internet protocol (TCP/IP), and may include a mobile communication network 1010 for transmitting a voice, an image, and data through a mobile phone including but not in any way limited to a code division multiple access (CDMA) scheme, a wideband code division multiple access (WCDMA) scheme, a Global System for Mobile (GSM) communications scheme, or a long term evolution (LTE) scheme.

The plurality of terminal devices 100-1 and 100-2 may transmit/receive instant messages therebetween through the communication network 1010, and may display contents of the instant messages on display screens. The contents of the instant messages may include files of various formats such as images, videos, music, and documents as well as simple texts. A file that that is difficult to display directly on a display screen, such as a video, music, or a document, may be displayed in the form of a link. The display could also be, for example, an image of a frame from the video.

With continued reference to FIG. 1, the plurality of terminal devices 100-1 and 100-2 may display the content of an instant message according to display identification information included in a header of the instant message. The display identification information indicates whether to display the instant message on a display screen, and may include message cancellation information and message display information. The message cancellation information prevents the instant message from being displayed on the display screen, and the message display information allows the instant message to be displayed on the display screen.

According to a user command of a transmitting-side terminal device that has transmitted an instant message, from among the plurality of terminal devices 100-1 and 100-2, the display of the transmitted instant message may be cancelled or restored. When a user of the transmitting-side terminal device inputs a command for cancelling display of the instant message, the plurality of terminal devices 100-1 and 100-2 may not delete the instant message itself and may merely hide the instant message from the display screen so that the instant message is not displayed. When the user of the transmitting-side terminal device inputs a command for restoring the instant message, the plurality of terminal devices 100-1 and 100-2 may display the instant message on the display screen.

Figure 2:
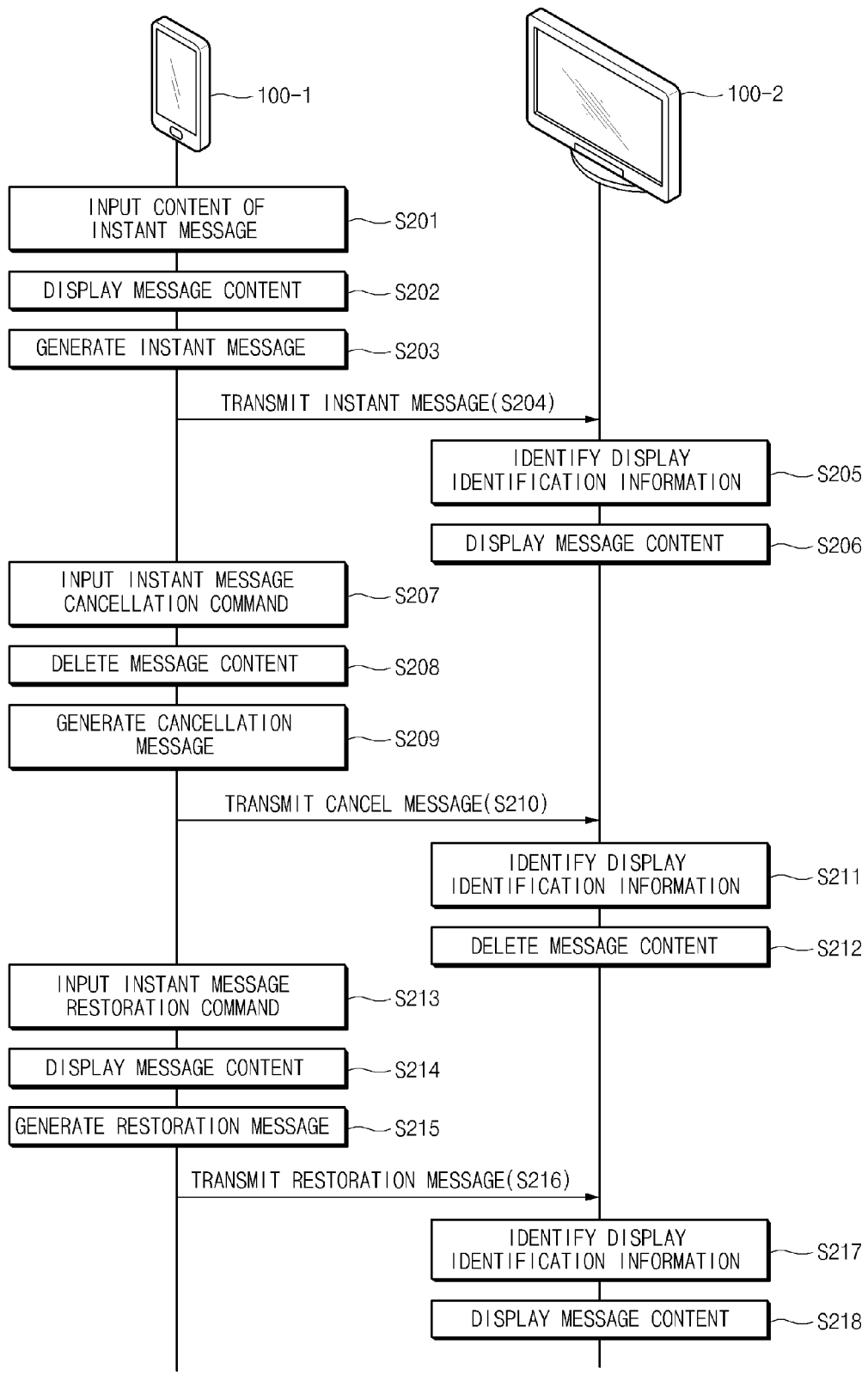
FIG. 2 is a flowchart illustrating a particular method for controlling an instant message transmitting/receiving system according to an embodiment of the present invention.

FIG. 2 is a flowchart illustrating a method for controlling the instant message transmitting/receiving system according to an embodiment of the present invention.

Each of the plurality of terminal devices 100-1 and 100-2 of FIG. 2 is capable of transmitting and receiving an instant message. However, for convenience, the explanation assumes that the first terminal device 100-1 is a transmitting-side terminal device and the second terminal device 100-2 is a receiving-side terminal device.

Referring now to FIG. 2, when the transmitting-side terminal device 100-1 receives the content of an instant message from a user (operation S201), the transmitting-side terminal device 100-1 displays the content of the instant message on a display screen (operation S202). Furthermore, an instant message including the content is generated (operation S203). Thereafter, the instant message is transmitted to the receiving-side terminal device 100-2 (operation S204). Here, a header of the instant message may include display identification information. While the transmission is shown in a peer to peer fashion between device 100-1 and 100-2, an artisan can appreciate that operation 204 and other transmission operations may be performed via a communication network.

The receiving-side terminal device 100-2 identifies the display identification information included in the header of the instant message upon receiving the instant message from the transmitting-side terminal device 100-1 (operation S205). When the display identification information is message display information, the receiving-side terminal device 100-2 displays the content of the instant message on a display screen (operation S206).

Here, the user of the transmitting-side terminal device 100-1 may intend to cancel the transmitted instant message due to the misdesignation of a receiver, for example. When the user cancels the transmitted instant message, the transmitting-side terminal device 100-1 receives a command for cancelling the instant message from the user (operation S207). When the cancellation command is received from the user, the transmitting-side terminal device 100-1 deletes the display of content of the cancellation-requested instant message from a display screen (operation S208). Then, a cancellation message of the cancellation-requested instant message is generated (operation S209), and is transmitted to the receiving-side terminal device 100-2 (operation S210). Here, the cancellation message has a header that includes message cancellation information, and the cancellation message may only include the header other than the content of an instant message. An artisan should understand and appreciate that while the examples utilize the header, that the message cancellation information could also be located in another part of the message, for example, a trailer.

The receiving-side terminal device 100-2 identifies the display identification information included in the header of the cancellation message upon receiving the cancellation message from the transmitting-side terminal device 100-1 (operation S211). Since the header of the cancellation message includes the message cancellation information, the receiving-side terminal device 100-2 deletes the content of the cancellation-requested instant message from a display screen (operation S212).

When the user of the transmitting-side terminal device 100-1 restores the cancelled message, the transmitting-side terminal device 100-1 receives a command for restoring the instant message from the user (operation S213). When the restoration command is received from the user, the transmitting-side terminal device 100-1 retrieves the original message from storage and displays the content of the restoration-requested instant message on a display screen (operation S214). Then, a restoration message of the restoration-requested instant message is generated (operation S215), and is transmitted to the receiving-side terminal device 100-2 (operation S216). Here, the restoration message is a message in which a header includes message display information, and the restoration message may only include the header excluding the content of an instant message.

The receiving-side terminal device 100-2 identifies the display identification information included in the header of the restoration message upon receiving the restoration message from the transmitting-side terminal device 100-1 (operation S217). Since the header of the restoration message includes the message display information, the receiving-side terminal device 100-2 displays the content of the restoration-requested instant message on a display screen again (operation S218).

Although it has been described, with reference to FIG. 2, that an instant message is transmitted to another terminal device after displaying or deleting the display of the content of the instant message on or from a display screen when the content of the instant message and a user command such as a cancellation command or restoration command are input, the content of the instant message may also be displayed or deleted on or from the display screen after transmitting the instant message to the other terminal device.

The above-described instant message transmitting/receiving system according to an embodiment of the present invention may cancel an instant message that has been transmitted to the receiving-side terminal device. Furthermore, a user may obtain the same net result as if an instant message has been deleted, by simply changing an indication of whether to display the instant message on a display screen without deleting the instant message itself. Moreover, since the instant message itself is not actually deleted, the cancelled instant message may be restored.

However, when a sender of an instant message cancels a message transmitted to the receiving-side terminal device 100-2 without any restriction, the issue of information protection for the receiver may arise. Therefore, when a preset event occurs after the instant message is transmitted, the authority of the sender to cancel and restore the instant message may be restricted. Furthermore, when the sender does have the authority to cancel and restore the instant message, at least one of the authorities of the receiver to copy, amend, forward, and delete the instant message may be restricted.

Figure 3:
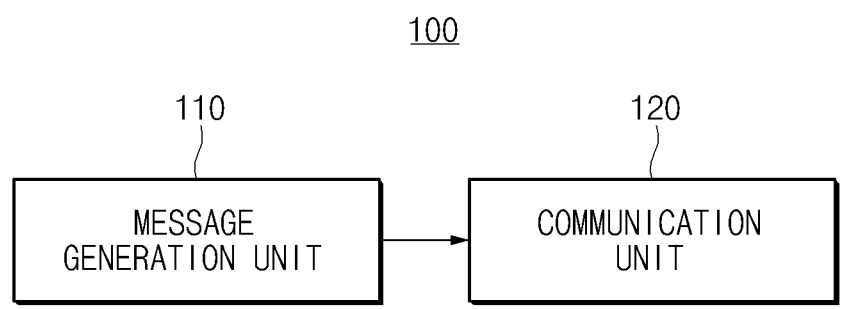
FIG. 3 is a block diagram illustrating a particular configuration of a terminal device according to an embodiment of the present invention.

FIG. 3 is a block diagram illustrating a configuration of a terminal device according to an embodiment of the present invention.

Referring now to FIG. 3, a terminal device 100 includes a message generation unit 110 and a communication unit 120. A person of ordinary skill in the art should understand and appreciate that these items shown in FIG. 3 include circuitry (such as a processor, microprocessor or controller configured to operate) and thus comprise statutory subject matter.

The message generation unit 110 generates an instant message according to a command of a user. In detail, when the content of the instant message is input by the user, the message generation unit 110 generates the instant message including the content. The message generation unit 110 may generate the instant message in the form of a transmission packet so as to transmit the instant message through a communication network. The message generation unit 110 performs appropriate signal processing according to the content of the instant message and packetizes the instant message to thereby generate the instant message in the form of a transmission packet.

The transmission packet-type instant message generated in the message generation unit 110 may be divided into at least a payload region including the content of the instant message and a header region including other information. Display identification information that indicates whether to display the instant message on a display screen may be inserted into the header of the instant message. The display identification information may include message cancellation information and message display information. The message cancellation information prevents the instant message from being displayed on the display screen, and the message display information allows the instant message to be displayed on the display screen. A structure of the instant message will be described in detail with reference to FIG. 4.

Figure 4:
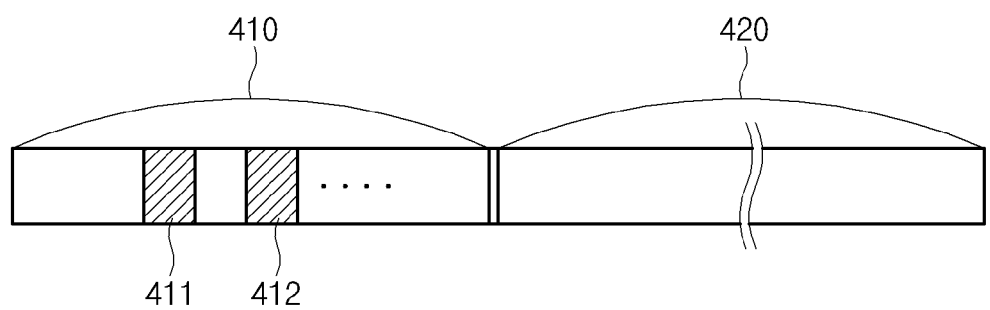
FIG. 4 is a diagram illustrating a particular structure of an instant message according to an embodiment of the present invention.

FIG. 4 is a diagram illustrating the structure of the instant message according to an embodiment of the present invention.

Referring now to FIG. 4, the instant message may be divided into a header region 410 and a payload region 420. The header 410 of the instant message includes various information for effectively transmitting data included in the payload region 420. In particular, the header 410 may include a display identification field 411 into which display identification information for identifying whether to display the instant message is inserted and a message identification field 412 into which message identification information for identifying each instant message is inserted.

With continued reference to FIG. 4, the display identification field 411 may include the message display information or the message cancellation information as the display identification information. Since an instant message is generated to instantly transfer the content of the message to a user of another terminal device, the display identification field 411 of the header of an instant message that is initially generated and transmitted may include the message display information. Here, there can be a changeable default regarding whether or not to insert the message display information or the message cancellation information into the initially generated and transmitted message, which may be changed according to a user setting.

The message identification field 412 may include the message identification information. The message identification information represents unique identification information for distinguishing each instant message. The message identification information includes information for specifying a message sender and a message receiver through a cell phone number, a user account, or a terminal identifier and information for identifying instant messages transmitted/received between the specified message sender and receiver, such as a time stamp and a message sending time.

When a command for cancelling or restoring the instant message is received from the user, the message generation unit 110 generates a respective cancellation message or a restoration message for the instant message. The message cancellation information may be inserted as the display identification information into a header of the cancellation message, and the message display information may be inserted as the display identification information into a header of the restoration message.

The cancellation message or the restoration message is a message for changing an indication of whether to display the instant message in another terminal device, and thus does not need to include the content of the instant message. Therefore, each of the cancellation message and the restoration message may only include the header excluding the content of the instant message (i.e. payload region). In other words, each of the cancellation message and the restoration message may only include the header region 410 of FIG. 4. Therefore, a transmission load that may occur during transmission of the cancellation message and the restoration message may be minimized.

Figure 5:
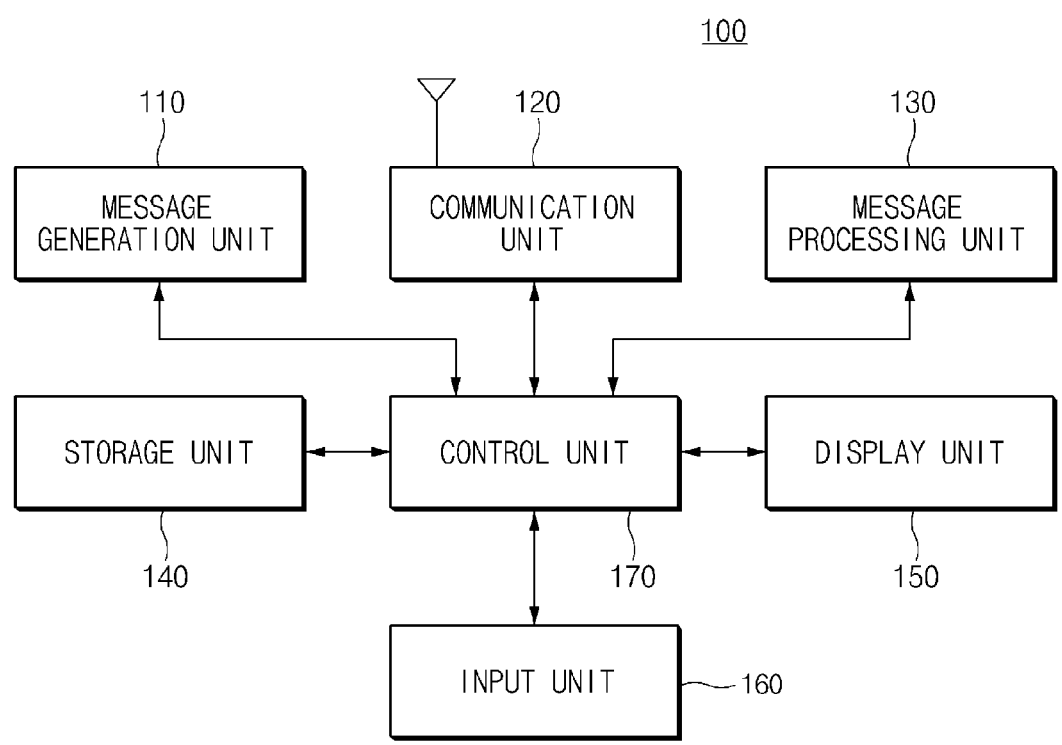
FIG. 5 is a block diagram illustrating a particular configuration of a terminal device according to another embodiment of the present invention.

FIG. 5 is a block diagram illustrating a configuration of a terminal device according to another embodiment of the present invention.

Referring now to FIG. 5, a terminal device 100 may include a message processing unit 130, a storage unit 140, a display unit 150, an input unit 160, and a control unit 170 in addition to the message generation unit 110 and the communication unit 120 illustrated in FIG. 3. Since the overlapping elements of FIG. 3 and FIG. 5 have the same operations, detailed descriptions of the overlapping elements will not be provided.

The communication unit 120 transmits the instant message generated in the message generation unit 110 to another device. The communication unit 120 may transmit the instant message in an appropriate manner according to the type of communication network. The communication unit 120 may transmit the cancellation message or the restoration message generated in the message generation unit 110 to the other terminal device. Furthermore, the communication unit 120 may receive the instant message, the cancellation message, or the restoration message from the other terminal device.

When the instant message is received from another terminal device through the communication unit 120, the message processing unit 130 performs signal processing on the received instant message so as to output the content of the instant message. The message processing unit 130 may output the display identification information and the message identification information included in the header of the received instant message. Furthermore, when the cancellation message or the restoration message is received from the other terminal device, the message processing unit 130 may perform signal processing on the cancellation message or the restoration message so as to output the display identification information and the message identification information.

The storage unit 140, which is a non-transitory memory, may be configured to map the content included in a transmitted/received instant message to the display identification information in order to store the content and the display identification information. In detail, when the content of the instant message is input through the input unit 160, the storage unit 140 may controlled to map the content of the instant message to the display identification information on the instant message in order to store the content and the display identification information. Furthermore, the storage unit 140 may be controlled to map the content included in an instant message received from the other terminal device to the display identification information on the instant message in order to store the content and the display identification information. Furthermore, the storage unit 140 may be controlled to map and store the message identification information together with the content of the instant message and the display identification information.

When the cancellation command or the restoration command for a stored instant message is entered through the input unit 160, the storage unit 140 may update the display identification information on the stored instant message with the message cancellation information or the message display information. Furthermore, when the cancellation message or the restoration message is received from the other terminal device, the storage unit 140 may update the display identification information on the instant message with the message cancellation information or the message display information inserted into the header of the cancellation message or the restoration message.

Figure 6:
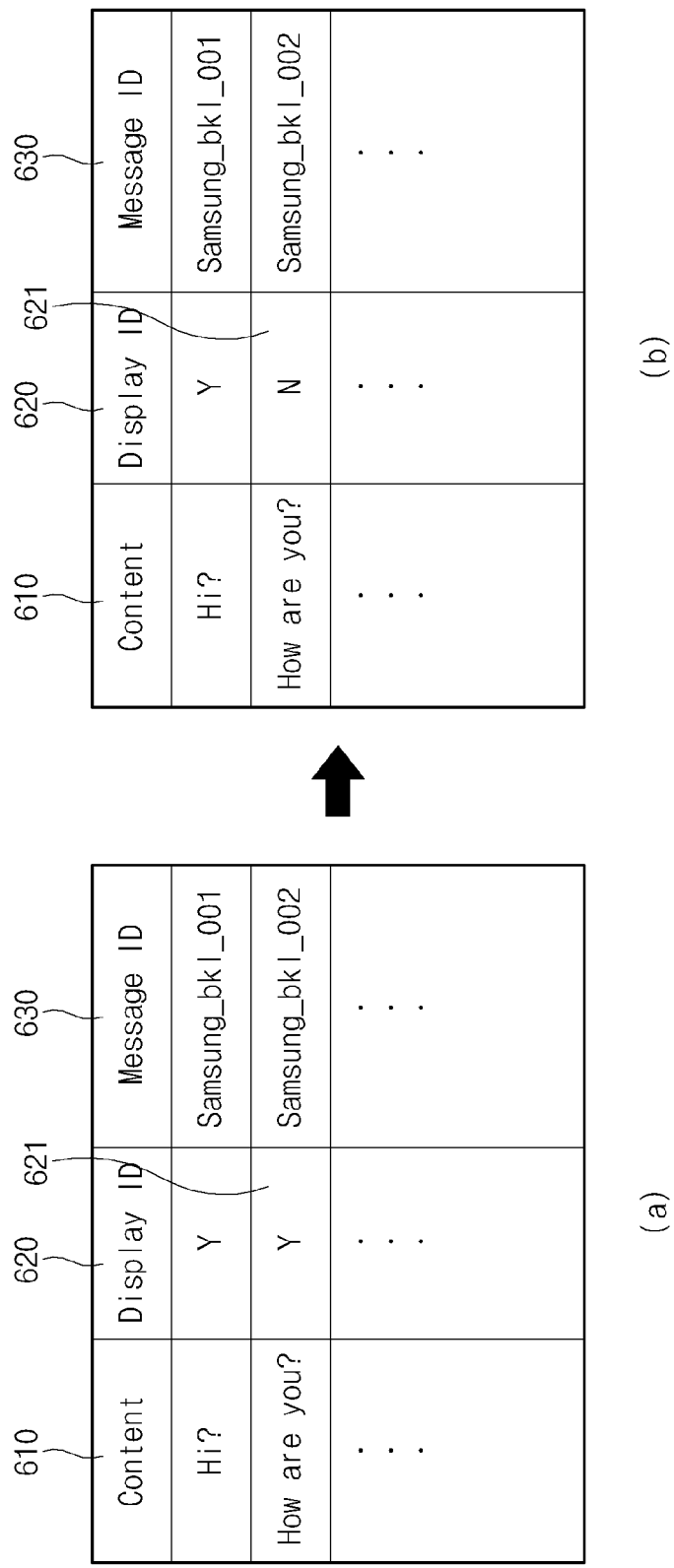
FIGS. 6(a) and 6(b) are respective diagrams, in which "Display ID" column 620 in FIG. 6(a) illustrates information stored in a storage unit according to an embodiment of the present invention

FIGS. 6(*a*) and 6(*b*) are diagrams illustrating information stored in the storage unit according to an embodiment of the present invention.

Referring now to FIG. 6(*a*), the storage unit 140 may map content 610, display identification information 620, and message identification information 630 of an instant message to each other so as to store the instant message in the form of a map table. As illustrated in FIG. 6(*a*), the display identification information 620 may be stored as 'Y' or 'N', wherein 'Y' represents the message display information and 'N' represents the message cancellation information. The message identification information 630 may have a form for specifying a receiver, a sender, and a message, such as 'samsung_bk1_001'.

FIG. 6(*b*) illustrates a situation where display identification information 621 is updated in the map table. Referring to FIG. 6(*b*), it may be understood that the display identification information 621 on the second message "How are you?" stored in the map table is updated from 'Y' to 'N', when the cancellation command of a user is input. Here, the message identification information 630 may be used to specify an instant message for which the display identification information 620 is to be updated. For example, when the user inputs the cancellation command for a second instant message, the cancellation command may include the message identification information on the second instant message. The control unit 170 may compare the message identification information on the second instant message with that stored in the map table so as to specify the second instant message.

With reference again to FIG. 5, the display unit 150 displays the content of the instant message on a display screen. In detail, the display unit 150 may display the content of the instant message according to the display identification information included in the header of the instant message. For example, the instant message may be displayed when the display identification information is the message display information, and the instant message will not be displayed when the display identification information is the message cancellation information.

When the cancellation command for the instant message is input through the input unit 160 or the cancellation message is received from another terminal device through the communication unit 120, the display unit 150 may control a display screen so that an output of the content of the instant message is deleted from the display screen. Furthermore, when the cancellation command for the instant message is input through the input unit 160 or the cancellation message is received from another terminal device through the communication unit 120, the display unit 150 may display an object indicating that the instant message has been cancelled.

When the cancellation command for the instant message is input through the input unit 160, the display unit 150 may display, on a display screen, an object indicating that the instant message is requested to be cancelled, in which the object can be either graphical, textual, etc. Thereafter, when the cancellation message is transmitted to another terminal device and response information indicating message cancellation is received from the other terminal device, the object may be deleted from the display screen and/or an object indicating that the instant message has been cancelled may be displayed on the display screen.

Furthermore, when the restoration command for a cancelled message is input through the input unit 160 or the restoration message for the cancelled message is received from the other terminal device through the communication unit 120, the display unit 150 may display the deleted message again on the display screen.

The display unit 150 may display the content of the instant message on the display screen according to the display identification information stored in the storage unit 140. When the display identification information stored in the storage unit 140 is updated, the content of the instant message may be deleted or displayed according to the updated information.

Hereinafter the processes of displaying, cancelling, and restoring an instant message on a display screen will be described in detail with reference to FIGS. 7, 8, 9, 10, 11, 12 and 13.

Figure 7:
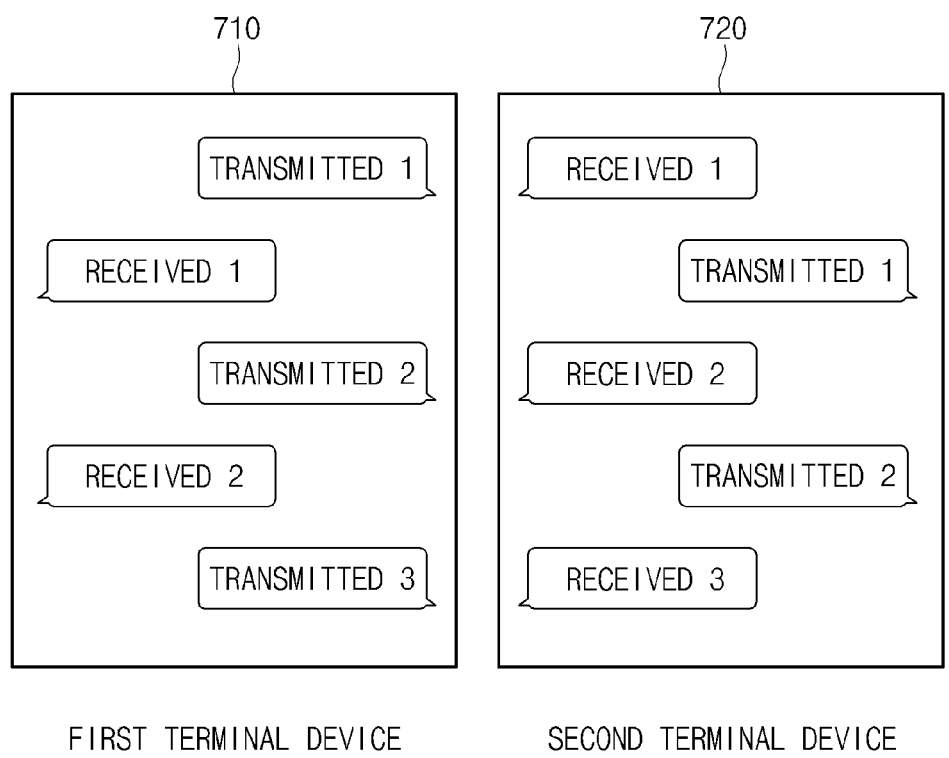
FIG. 7 is a diagram illustrating a particular display screen for displaying an instant message according to an embodiment of the present invention.

FIG. 7 is a diagram illustrating a display screen for displaying an instant message according to an embodiment of the present invention.

When instant messages are transmitted/received between two terminal devices, the messages may be displayed on display screens as illustrated in FIG. 7. As described above, a transmitted/received instant message may be displayed on a display screen according to the display identification information on the message. Referring now to FIG. 7, a plurality of transmitted messages and a plurality of received messages are displayed in the form of text bubbles on display screens 710 and 720. The left display screen 710 represents a display screen of a first terminal device among the two terminal devices which transmit/receive instant messages to/from each other, and the right display screen 720 represents a display screen of a second terminal device. As understood an appreciated by an artisan, the name of the terminals (first, second) can be the reverse of what is shown and described. The transmitted messages on the display screen 710 of the first terminal device correspond to the received message on the display screen 720 of the second terminal device, and the received messages on the display screen 710 of the first terminal device correspond to the transmitted message on the display screen 720 of the second terminal device, respectively. The contents of the instant messages may be displayed in text bubbles. The transmitted messages and the received messages may be aligned downwardly or upwardly on the display screens 710 and 720 according to transmission times. The transmitted messages may be displayed on the right sides of the display screens 710 and 720 and the received message may be displayed on the left sides of the display screens 710 and 720, or vice versa.

The user of the terminal device 100 may display, for example, a popup menu for inputting a user command for a specific instant message, on such a display screen as illustrated in FIG. 7. The case where the user of the first terminal device inputs the user command for displaying the popup menu for the transmitted message 2 will be described with reference to FIG. 8.

Figure 8:
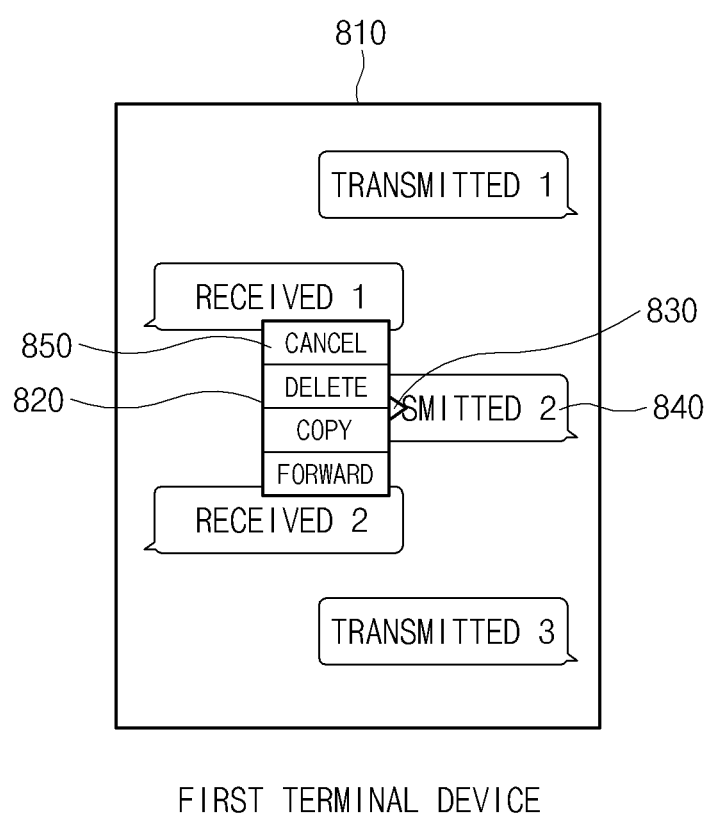
FIG. 8 is a diagram illustrating a particular popup menu for receiving a user command for an instant message according to an embodiment of the present invention.

FIG. 8 is a diagram illustrating the popup menu for receiving the user command for the instant message according to an embodiment of the present invention.

Referring now to FIG. 8, a popup menu 820 is displayed on a plurality of messages displayed on a display screen 810 of a first terminal device. As illustrated in FIG. 8, the popup menu 820 provides options for a specific message, such as cancel, delete, copy, and forward. When the user command for displaying the popup menu 820 is input, the popup menu 820 may pop up to be displayed on one or more of the plurality of messages displayed on the display screen. The popup menu 820 may include a tail indicating a specific instant message in order to distinguish an instant message for which the popup menu 820 is displayed. Referring now to FIG. 8, the tail 830 being displayed indicates a second transmitted message 840. When the user selects a 'cancel' option 850 on the popup menu 820, the cancellation command for the second transmitted message may be input. The case where the user selects the 'cancel' option 850 will now be described with reference to FIGS. 9 and 10.

Figure 9:
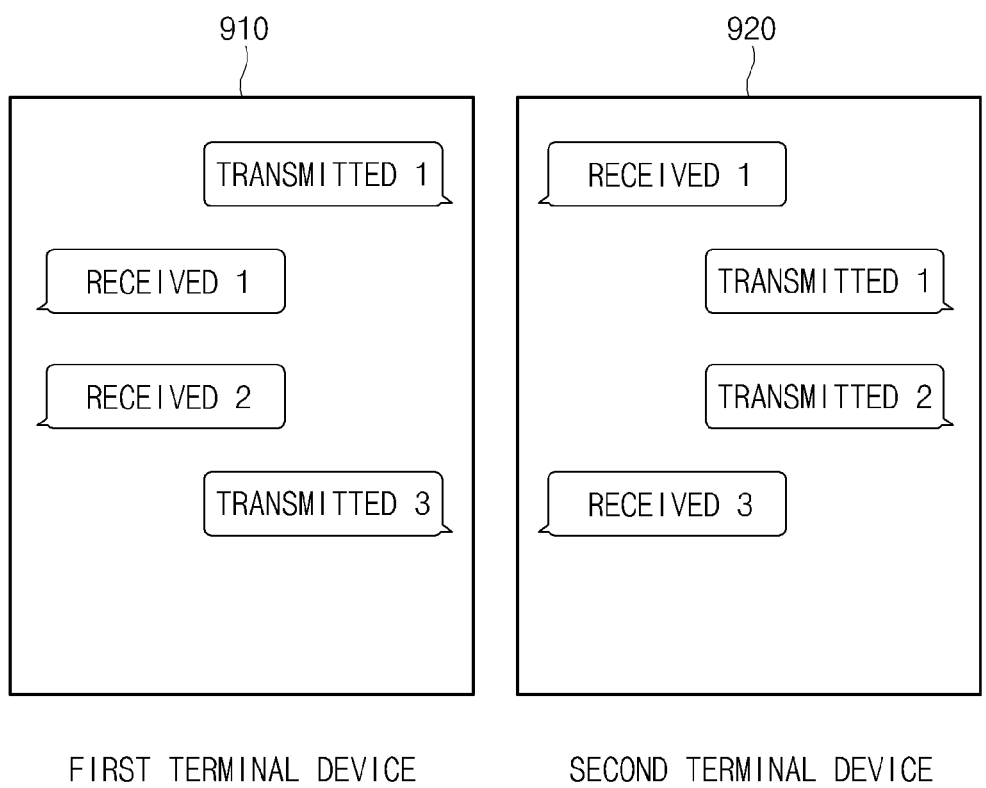
FIG. 9 is a diagram illustrating a particular display screen in which an instant message is cancelled according to an embodiment of the present invention.

FIG. 9 is a diagram illustrating a display screen in which an instant message is cancelled according to an embodiment of the present invention.

Referring now to FIG. 9, a plurality of transmitted messages and a plurality of received messages are displayed in the form of text bubbles on display screens 910 and 920. Compared to the display screens of FIG. 7, the second transmitted message is deleted from the display screen 910 of the first terminal device and the second received message is deleted from the display screen 920 of the second terminal device.

When the user of the first terminal device inputs the cancellation command for the second transmitted message, the first terminal device may generate the cancellation message for the second transmitted message to transmit the cancellation message to the second terminal device, and may delete the second transmitted message from the display screen 910. The second terminal device may delete the second received message from the display screen 920 upon receiving the cancellation message for the second received message from the first terminal device. Accordingly, the message may be deleted from not only the display screen of the first terminal device but also the display screen of the second terminal device.

Figure 10:
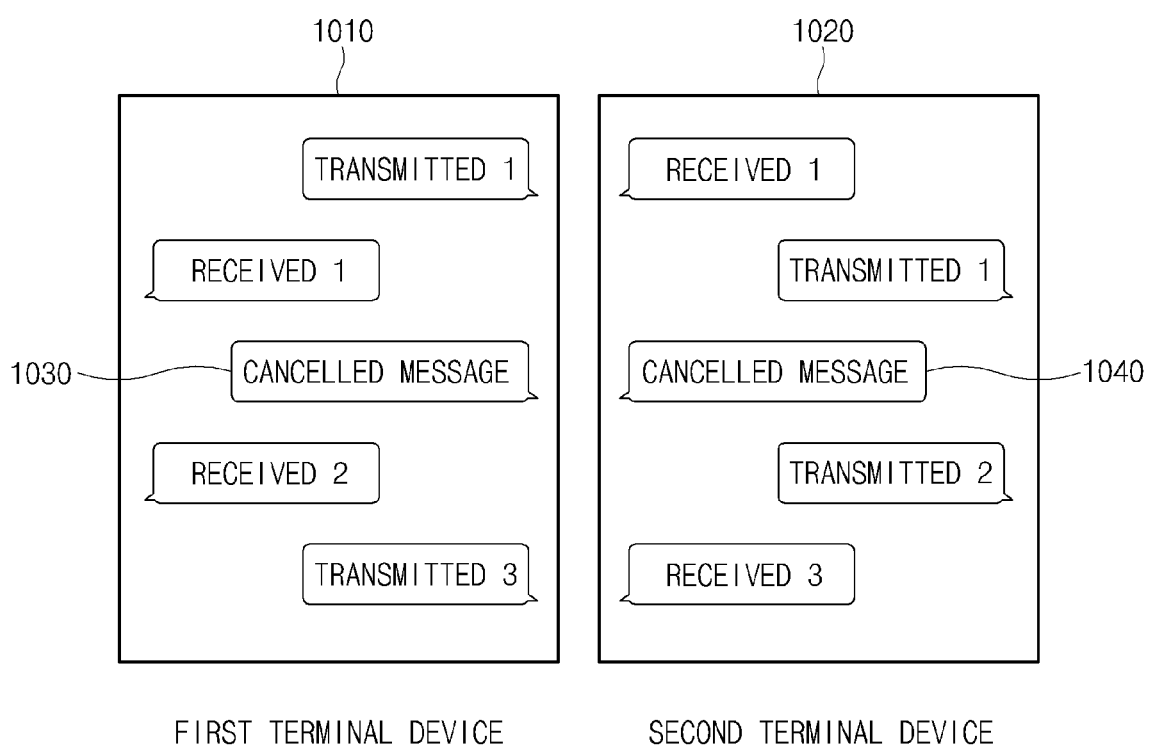
FIG. 10 is a diagram illustrating a particular display screen in which an instant message is cancelled according to another embodiment of the present invention.

FIG. 10 is a diagram illustrating a display screen in which an instant message is cancelled according to another embodiment of the present invention.

Referring now to FIG. 10, a plurality of transmitted messages and a plurality of received messages are displayed in the form of text bubbles on display screens 1010 and 1020 of respective first terminal device and second terminal device. Compared to the display screens, for example, of FIG. 7, the second transmitted message on the display screen 1010 of the first terminal device and the second received message on the display screen 1020 of the second terminal device are respectively changed to objects 1030 and 1040 indicating they are cancelled messages.

When the user of the first terminal device inputs the cancellation command for the second transmitted message, the first terminal device may generate the cancellation message for the second transmitted message to transmit the cancellation message to the second terminal device, and may display, on the display screen 1010, the object 1030 indicating that the second message by the first terminal has been cancelled. The second terminal device may display the object 1040 indicating that the second received message by the second terminal device has been cancelled upon receiving the cancellation message for the second received message from the first terminal device.

The objects 1030 and 1040 indicating the cancellation of messages may be displayed in various manners. For example, the objects may be expressed in text indicating the cancellation of messages, such as 'cancelled message' or 'cancel'. Alternatively, the objects may be expressed using a specific diagram or character. Furthermore, the transparency or background color of the objects indicating the cancellation of messages may be changed, or specific patterns may be inserted thereto, in other words some type of visual distinction so the user notices the cancellation, or restoration, of a message or messages.

Figure 11:
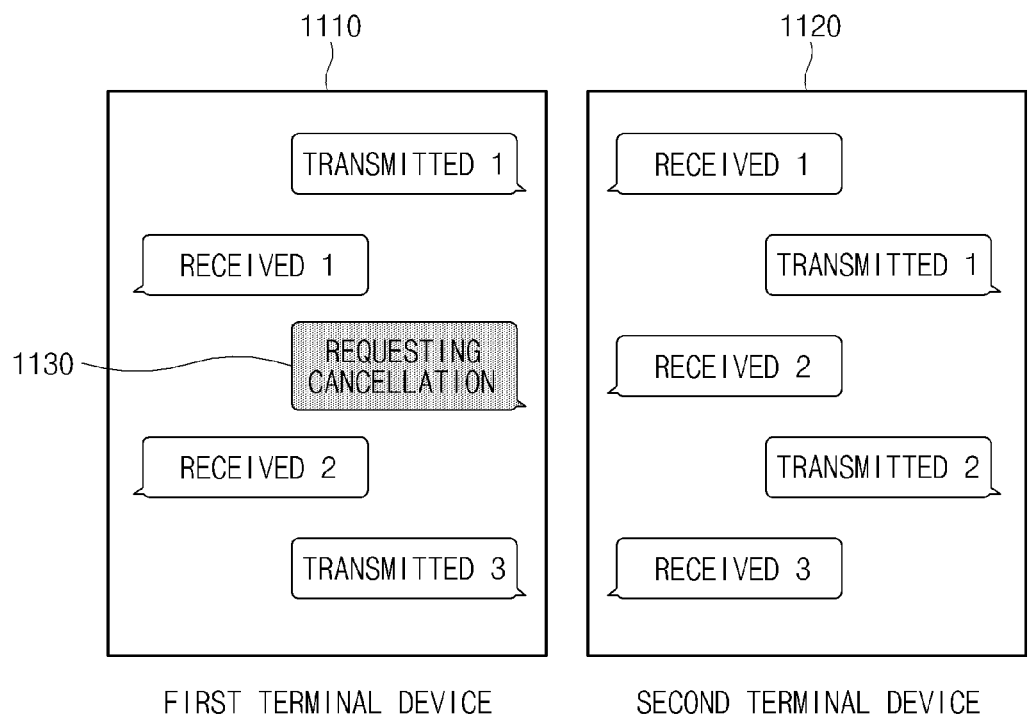
FIGS. 11(a) and 11(b) are diagrams illustrating a particular display screen during a process in which an instant message is cancelled according to another embodiment of the present invention.
Figure 11:
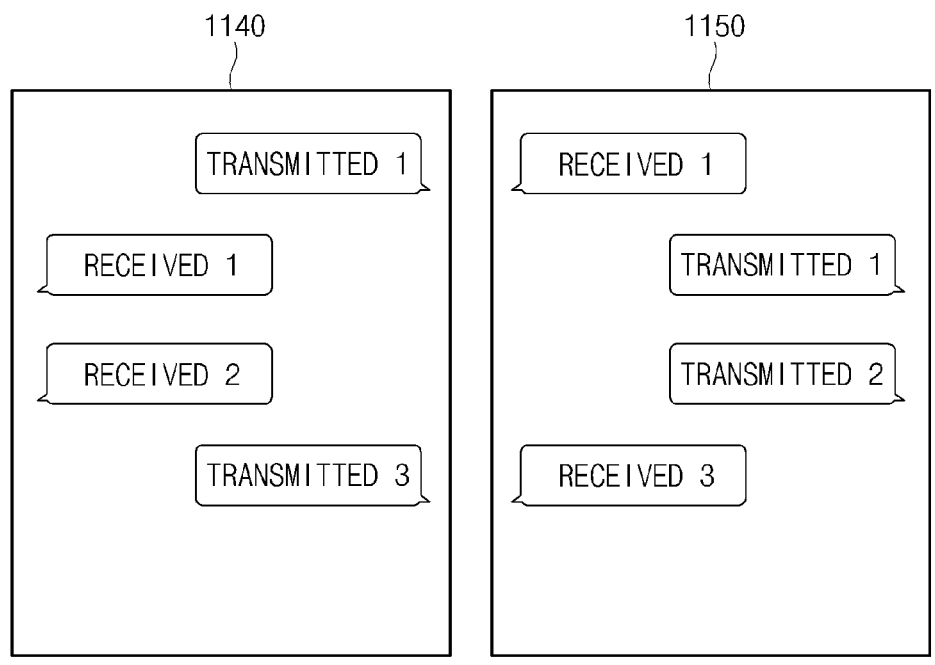

FIG. 11(*a*) and FIG. 11(*b*) are diagrams illustrating a display screen sequence in which an instant message is cancelled according to another embodiment of the present invention.

Referring now to FIG. 11*a*, an object 1130 indicating that the second transmitted message from the first terminal device is being requested to be cancelled, the cancellation request is displayed on a display screen 1110 of the first terminal device. When the user of the first terminal device inputs the cancellation command for the second transmitted message, the object indicating that the second transmitted message is being requested to be cancelled may be displayed as illustrated in FIG. 11(*a*).

When the cancellation command for the second transmitted message is input, the first terminal device may generate the cancellation message for the second transmitted message to transmit the cancellation message to the second terminal device. Upon receiving the cancellation message, the second terminal device may delete the second received message from the display screen as illustrated in FIG. 11(*b*) (where "received 2" is no longer shown), or may display the object indicating that the second received message has been cancelled as illustrated in FIG. 10. Furthermore, the second terminal device may transmit, to the first terminal device, response information indicating that the second received message has been cancelled. Upon receiving the response information indicating that the second transmitted message has been cancelled from the second terminal device, the first terminal device may delete the display of the second transmitted message from a display screen 1140 as illustrated in FIG. 11(*b*), or may display the object indicating that the second transmitted message has been cancelled, as previously illustrated in FIG. 10.

The object 1130 indicating that the instant message is being requested to be cancelled may be displayed in various manners other than shown and described herein. For example, the object may be expressed as text indicating that a message is being requested to be cancelled, such as 'requesting cancellation' or 'cancelling'. Alternatively, the object may be expressed using a specific diagram or character. The transparency or background color of the object 1130 indicating that a message is being requested to be cancelled may be changed, or a specific pattern may be inserted thereto. Other types of visual indicators may be displayed to indicate that an instant message is requested to be canceled.

Figure 12:
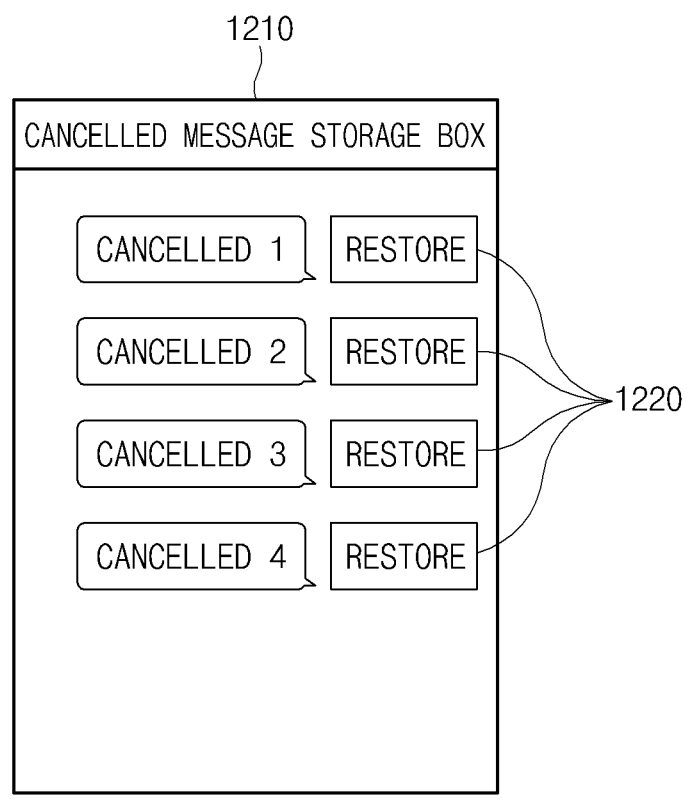
FIG. 12 is a diagram illustrating a particular display screen for restoring an instant message according to an embodiment of the present invention.

FIG. 12 is a diagram illustrating a display screen for restoring an instant message according to an embodiment of the present invention.

Referring now to FIG. 12, a plurality of cancelled messages are displayed on a display screen 1210. When the user cancels an instant message, the cancelled message may be stored in a cancelled message "storage box" as illustrated in FIG. 12. In other words, the storage unit 140 may separately store information on cancelled messages. The cancelled messages may be aligned according to cancelled times or message transmission times in order to be displayed.

A restoration menu 1220 for restoring a message may be provided to each cancelled message, for example, as illustrated in FIG. 12. The user may input the restoration command for a specific message using the restoration menu. For example, when the user selects the restoration menu for a second cancelled message, the terminal device 100 may display the second cancelled message on a display screen again and may generate the restoration message for the second cancelled message to transmit the restoration message to another terminal device. An artisan appreciates that the display of FIG. 12 is not the only way a canceled message restoration sheet may be configured. In addition, it is possible there are no "restore" buttons 1220, and merely touching or tapping the "canceled 1", or "canceled 2" message for a predetermined period of time can trigger a popup or prompt asking a user whether restoration of the canceled message is desired.

Figure 13:
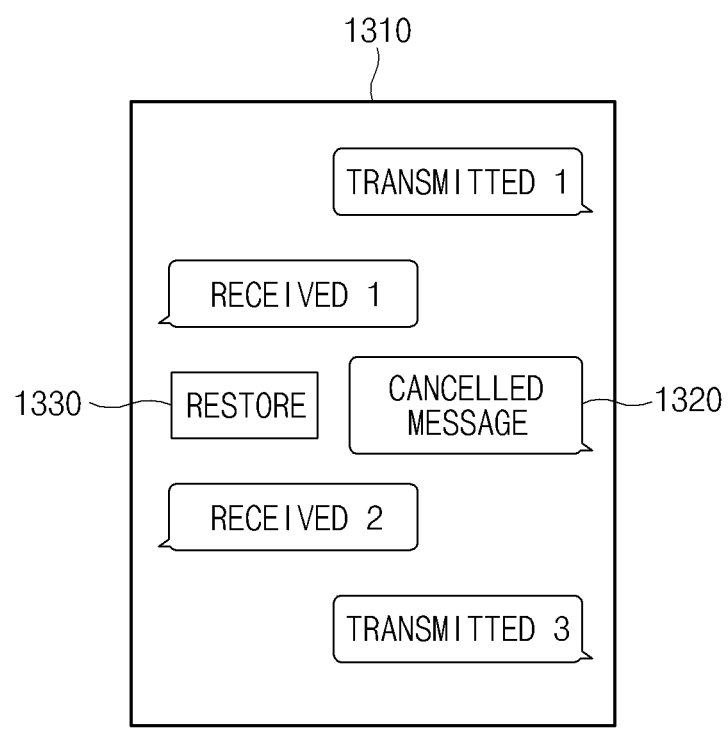
FIG. 13 is a diagram illustrating a particular display screen for restoring an instant message according to another embodiment of the present invention.

FIG. 13 is a diagram illustrating a display screen for restoring an instant message according to another embodiment of the present invention. In particular, FIG. 13 illustrates the case where the object indicating that a message has been cancelled is displayed on a display screen as illustrated in FIG. 10. Referring now to FIG. 13, a restoration menu 1330 for restoring a cancelled message is displayed, on the display screen, at the left of an object 1320 indicating that a message has been cancelled. According to an embodiment, when the instant message is cancelled, the restoration menu 1330 may be automatically displayed at the side of the object indicating that the message has been cancelled, or the user may input the user command for the object so as to generate the restoration menu. The user may input the restoration command for a specific message using the restoration menu 1330. For example, when the user selects the restoration menu 1330, the terminal device 100 may display the cancelled message on a display screen again, as illustrated in the display screen 710 of the first terminal of FIG. 7, and may generate the restoration message for the cancelled message to transmit the restoration message to another terminal device.

With reference again to FIG. 5, the input unit 160 receives the user command for controlling the terminal device 100 from the user. In particular, the input unit 160 may receive the content of the instant message from the user. The content of the instant messages may include files of various formats such as images, videos, music, and documents as well as simple texts. Furthermore, the input unit 160 may receive the cancellation command or the restoration command for the instant message from the user.

To this end, the input unit 160 may be implemented with at least one of a touch screen or a touch pad operated by touch input from the user, a keypad or a keyboard provided with various function keys, numeric keys, special keys, and character keys, a remote controller, a mouse, a motion recognition sensor for recognizing a motion of the user, and a voice recognition sensor for recognizing a voice of the user. Voice activation is also another way for the terminal to receive an input to cancel a particular message.

The input unit 160 may be variously implemented according to a type and characteristic of the terminal device 100.

For example, in the case where the terminal device 100 is implemented with a smartphone, the input unit 160 may be implemented with the touch screen and the voice recognition sensor. In the case where the terminal device 100 is implemented with a TV, the input unit 160 may be implemented with the remote controller, the motion recognition sensor, and the voice recognition sensor. In the case where the terminal device 100 is implemented with a laptop computer, the input unit 160 may be implemented with the keypad and the touch pad. Various combinations of implementation of the input unit can be practiced.

The control unit 170 includes circuitry such as a processor or microprocessor configured to control overall operation of the terminal device 100. In more detail, the control unit 170 may control each of the message processing unit 130, the storage unit 140, the display unit 150, and the input unit 160 so that operations of cancelling and restoring an instant message according to various embodiments of the present inventions are performed.

The control unit 170 may be configured to limit the authority to cancel or restore an instant message transmitted to another terminal device. In more detail, the control unit 170 may be configured to limit the input of the user command for cancelling or restoring the transmitted instant message when at least one of events occurs, wherein the events include a lapse of a preset time after transmitting the instant message to the other terminal device and a lapse of the preset time after the user of the other terminal device checks the instant message. Here, the preset time (for example, 10 minutes) may be set by the user.

The header of the instant message may include information on a message transmission time (or, generation time). The control unit 170 may be configured to determine how much time has elapsed after transmission of the instant message using the information on the transmission time of the instant message and information on a current time. When the user of the other terminal device checks the instant message transmitted thereto, the communication unit 120 may receive, from the other terminal, information on a time at which the instant message was checked. The control unit 170 may also be configured to determine how much time has elapsed after the user of the other terminal checked the instant message using the information on the instant message check time and the information on the current time. If the determined elapsed time is shorter than the preset time, the control unit 170 may allow the authorities to cancel and restore the instant message. Otherwise, the control unit 170 may allow the authorities to cancel and restore the instant message.

The control unit 170 may be configured to limit the authorities to copy, amend, forward, and delete the instant message received from the other terminal device. In detail, the control unit 170 may limit the authorities to copy, amend, forward, and delete the received instant message when at least one of events occurs, wherein the events include a lapse of a preset time after transmitting the instant message from the other terminal device and a lapse of the preset time after the user of the terminal device 100 checks the instant message. Here, the preset time (for example, 10 minutes) may be set by the user.

The header of the received instant message may include information on a message transmission time (or, generation time). The control unit 170 may be configured to determine how much time has elapsed after transmission of the instant message using the information on the transmission time of the received instant message and information on a current time. The control unit 170 may be configured to determine how much time has elapsed after the user checked the instant message using the information on the instant message check time and the information on the current time. If the determined elapsed time is shorter than the preset time, the control unit 170 may determine not to allow the authorities to copy, amend, forward, and delete the instant message. Otherwise, the control unit 170 may determine to allow the authorities to copy, amend, forward, and delete the instant message.

The storage unit 160, which is a non-transitory memory, may store an authority to control an instant message. This operation regarding an authority to control an instant message will be described in more detail with reference to FIG. 14.

Figure 14:
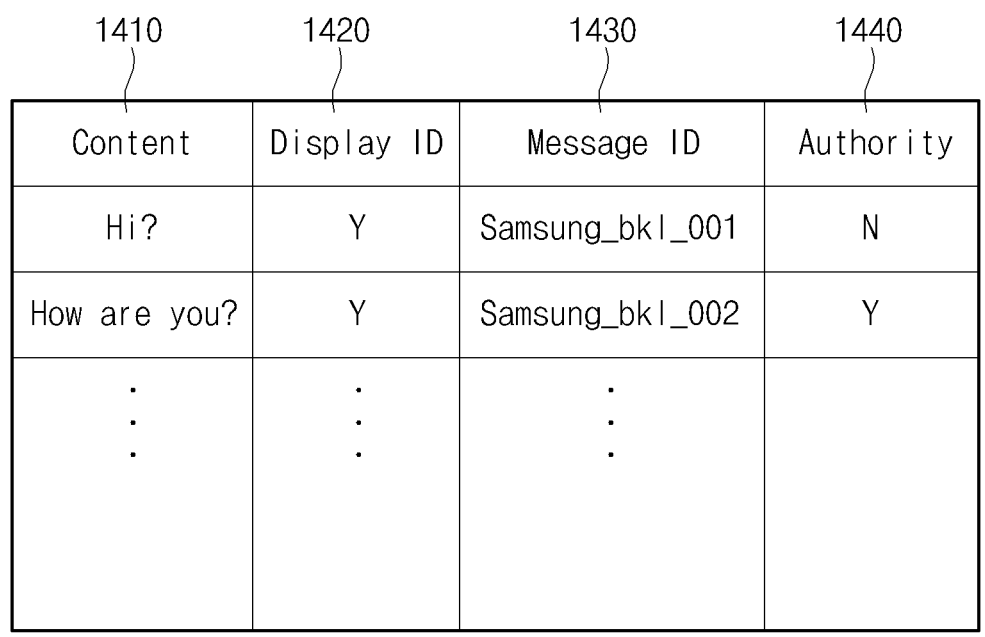
FIG. 14 is a diagram illustrating information stored in a storage unit according to another embodiment of the present invention.

FIG. 14 is a diagram illustrating information stored in the storage unit according to another embodiment of the present invention.

Referring now to FIG. 14, the storage unit 140 may map content 1410, display identification information 1420, message identification information 1430, and a control authority 1440 on the instant message to each other so as to store the instant message in the form of a map table, as one possible way for content to be mapped. When the user of the terminal device 100 has the authority on the instant message, the control authority 1440 may be stored as 'Y'. Otherwise, the control authority 1440 may be stored as 'N'.

The control unit 170 may be configured to check whether the control authority on the instant message stored in the storage unit 140 is changed in order to update, if the control authority is changed, the prestored control authority into information on a current control authority.

When the user command for the instant message is input, the control unit 170 may identify the control authority on the instant message stored in the storage unit 140, and may limit the input of the user command for the instant message when the user of the terminal device 100 does not have the control authority on the instant message. For example, when the user does not have the control authority on the instant message, the control unit 170 may prevent a menu for receiving the user command for the instant message from being displayed on the display screen. Alternatively, even though the user command for the instant message is input, the control unit 170 may display a message object (for example, 'You have no authority to control the message') indicating that there is no control authority on the instant message, without performing an operation corresponding to the user command. In detail, when there is no authority to cancel or restore the instant message, the popup menu 820 of FIG. 8 from which the 'cancel' option 850 is deleted may be displayed, or the restoration options 1220 and 1330 of FIGS. 12 and 13 may not be displayed.

Figure 15:
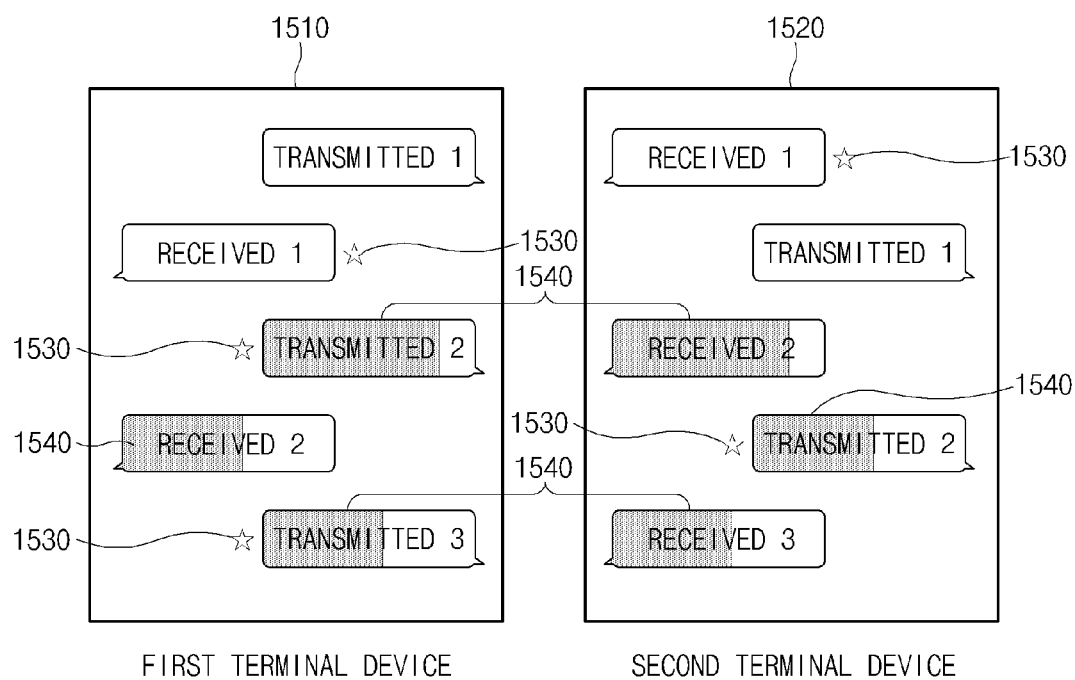
FIG. 15 is a diagram illustrating a particular display screen for displaying a control authority according to an embodiment of the present invention.

FIG. 15 is a diagram illustrating a display screen for displaying a control authority according to an embodiment of the present invention.

Referring now to FIG. 15, objects 1530 shaped like a star are displayed on display screens 1510 and 1520 of the first and second terminal devices. The control unit 170 may display an object indicating a control authority for a message for which the control authority is allowed. The object indicating the control authority may be expressed in text, character, or diagram, or may be expressed using different colors or different levels of transparency of a message. Therefore, the user may intuitively understand whether the user has the control authority on a specific message. The star shaped is but one of any time of visual indication that can be used.

Here, the control unit 170 may continuously change at least one of a shape, color, and transparency of an instant message displayed on the display screen. For example, referring to FIG. 15, partial regions 1540 of some of the instant messages displayed on the display screen 1510 and 1520 are marked with different color. The control unit 170 may increase a region occupied by a specific color with the lapse of time so as to visually express a remaining time until the control authority is changed for each message. Here, a message for which the control authority is allowed and a message for which the control authority is not allowed may be marked with different colors or other types of visual indication. Instead of changing the region occupied by the specific color, the control unit 170 may change a level of transparency of each instant message with the lapse of time so as to visually express a remaining time until the control authority is changed. Therefore, the user may intuitively understand the remaining time until the control authority on a specific message is changed.

Hereinafter methods for controlling terminal devices according to various embodiments of the present invention will be described in more detail. As described above, the terminal device 100 is capable of both transmitting and receiving instant messages, and may be operated as a transmitting-side terminal device or a receiving-side terminal device according to circumstances. That is, transmission and reception of instant messages may simultaneously occur in a single terminal device. However, for convenience, a process of transmitting an instant message and a process of receiving an instant message are differentiated herein since the processes are slightly different from each other. The same descriptions as mentioned above about the terminal device 100 with reference to FIGS. 3 to 15 will be omitted.

Figure 16:
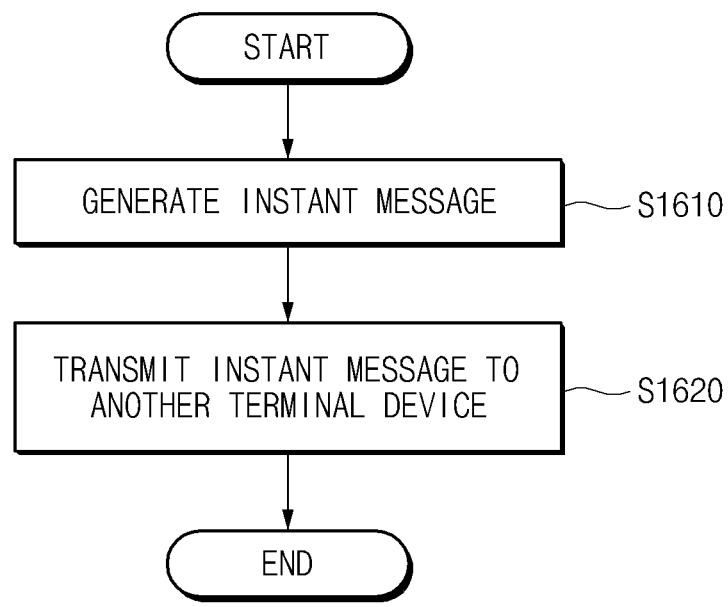
FIG. 16 is a flowchart illustrating a particular method for controlling a terminal device according to an embodiment of the present invention.

FIG. 16 is a flowchart illustrating operations of a method for controlling a terminal device according to an embodiment of the present invention. In particular, FIG. 16 illustrates the case where the terminal device 100 transmits an instant message.

Referring now to FIG. 16, the terminal device 100 generates an instant message (operation S1610). In detail, the terminal device 100 may generate the instant message in the form of a transmission packet transmittable through a communication network when the content of the instant message is input from a user. The display identification information that indicates whether to display the instant message on a display screen may be inserted into the header of the instant message. The structure of the instant message has been described with reference to FIG. 4, and thus a detailed description of the instant message will be omitted.

The generated instant message is transmitted to another terminal device (operation S1620).

When the cancellation command for the instant message transmitted to the other terminal device is input from the user, the cancellation message may be generated and may be transmitted to the other terminal device. The message cancellation information may be inserted as the display identification information into the header of the cancellation message. The cancellation message may only include the header other than the content of the instant message.

When the restoration message for the instant message is input, the terminal device 100 may generate the restoration message and may transmit the restoration message to the other terminal device. The message display information may be inserted as the display identification information into the header of the restoration message. The restoration message may only include the header other than the content of the instant message.

The terminal device 100 may display the content of the instant message on a display screen. In more detail, the terminal device 100 may display, on the display screen, the content of the instant message transmitted to the other terminal device according to the display identification information. When the display identification information is the message display information, the content of the instant message is displayed, or, when the display identification information is the message cancellation information, the content of the instant message is not displayed.

When the cancellation command for the instant message is input, the terminal device 100 may delete, from the display screen the display of content of the instant message for which the cancellation command is input. Furthermore, when the cancellation command for the instant message is input, the terminal device 100 may delete from the display screen, the display of the content of the instant message for which the cancellation command is input, may display an object indicating that the instant message is being requested to be cancelled, and may delete the object indicating that the instant message is being requested to be cancelled upon receiving response information indicating message cancellation from the other terminal. When the cancellation command for the instant message is input, the terminal device 100 may delete, from the display screen, the content of the instant message for which the cancellation command is input, and may display an object indicating that the instant message has been cancelled.

When the restoration command for the instant message is input, the terminal device 100 may display, on the display screen, the content of the instant message for which the restoration command is input again.

The processes of displaying, cancelling, and restoring the instant message transmitted to the other terminal device have been described with reference to FIGS. 7 to 13, and thus detailed descriptions of the processes will be omitted.

The terminal device 100 may store the transmitted instant message. In more detail, the content of the instant message and the display identification information may be mapped to each other in order to be stored. Here, the message identification information may also be mapped and stored. The terminal device 100 may determine whether to display the content of the instant message on the display screen using the stored display identification information. When the cancellation command or the restoration command for the instant message is input from the user, the terminal device 100 may update the display identification information on the instant message for which the cancellation command or the restoration command is input. This operation has been described with reference to FIG. 6, and thus a detailed description of the operation will be omitted.

The terminal device 100 may be configured to limit the input of the user command for cancelling or restoring a transmitted instant message when at least one of events occurs, wherein the events include a lapse of a preset time after transmitting the instant message and a lapse of the preset time after the user of the other terminal device checks the instant message. This operation has been described with reference to FIG. 14, and thus a detailed description of the operation will be omitted.

In addition, the terminal device 100 may continuously change display of at least one of a shape, color, and transparency of the instant message displayed on the display screen until at least one event occurs, wherein the at least one event includes a lapse of a preset time after transmitting the instant message and a lapse of the preset time after the user of the other terminal device checks the instant message.

This operation has been described with reference to FIG. 15, and thus a detailed description of the operation will be omitted.

Figure 17:
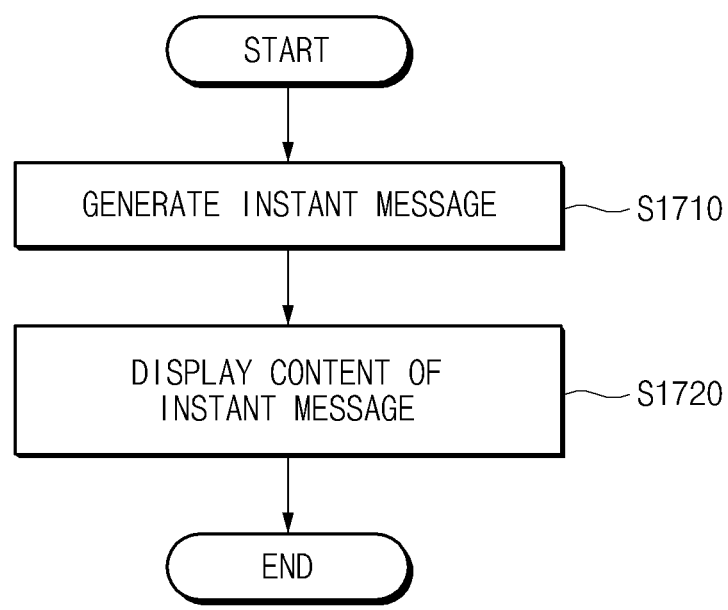
FIG. 17 is a flowchart illustrating a particular method for controlling a terminal device according to another embodiment of the present invention.

FIG. 17 is a flowchart illustrating a method for controlling a terminal device according to another embodiment of the present invention. In particular, FIG. 17 illustrates the case where the terminal device 100 transmits an instant message.

The instant message is received from another terminal device (operation S1710). The display identification information that indicates whether to display the instant message on a display screen may be included in the header of the instant message. The structure of the instant message has been described with reference to FIG. 4, and thus a detailed description of the instant message will be omitted.

The content of the instant message may be displayed on the display screen according to the display identification information (operation S1720). For example, the instant message may be displayed when the display identification information is the message display information, and the instant message may not be displayed when the display identification information is the message cancellation information.

The terminal device 100 may map the content included in the received instant message to the display identification information included therein in order to store the content and the display identification information, and may display the content of the instant message on the display screen according to the stored display identification information. The message identification information may also be mapped and stored in the storage unit together with the content of the instant message and the display identification information.

Furthermore, when the cancellation message or the restoration message is received from the other terminal device, the terminal device 100 may update the stored display identification information with the display identification information inserted into the header of the cancellation message or the restoration message. This operation has been described with reference to FIG. 6, and thus a detailed description of the operation will be omitted.

When the cancellation message is received from the other terminal device, the terminal device 100 may delete, from the display screen, the content of the instant message requested to be cancelled. Furthermore, when the cancellation message is received from the other terminal device, the terminal device 100 may display an object indicating that the instant message has been cancelled. When the restoration message for the cancelled message is received from the other terminal device, the terminal device 100 may display the cancelled message on the display screen again. The processes of displaying, cancelling, and restoring the instant message received from the other terminal device have been described with reference to FIGS. 7 to 13, and thus detailed descriptions of the processes will be omitted.

The terminal device 100 may be configured to limit the authorities to copy, amend, forward, and delete the instant message received from the other terminal device. In detail, the terminal device 100 may limit the authorities to copy, amend, forward, and delete the received instant message when the at least one of event occurs, wherein the at least one event includes a lapse of a preset time after transmitting the instant message from the other terminal device and a lapse of the preset time after the user of the terminal device 100 checks the instant message. This operation has been described with reference to FIG. 14, and thus a detailed description of the operation will be omitted.

In addition, the terminal device 100 may display a continuously changing of at least one of a shape, color, and transparency of the instant message displayed on the display screen until at least one of events occurs, wherein the events include a lapse of a preset time after transmitting the instant message from the other terminal device and a lapse of the preset time after the user of the terminal device 100 checks the instant message. This operation has been described with reference to FIG. 15, and thus a detailed description of the operation will be omitted.

It has been described, with reference to FIGS. 1 to 17, that if instant messages were directly transmitted/received between terminal devices according to the instant message transmitting/receiving system, the terminal device, and the terminal device controlling method according to various embodiments of the present invention. However, according to another embodiment, an instant message may be transmitted from a transmitting-side terminal device to a receiving-side terminal device via a server, network, base station or even an Access Point. Hereinafter the case where an instant message is transmitted to a terminal via a server will be described with reference to FIGS. 18 and 19. For convenience, overlapping descriptions will be omitted to focus on differences from the above description of FIGS. 1 to 17.

Figure 18:
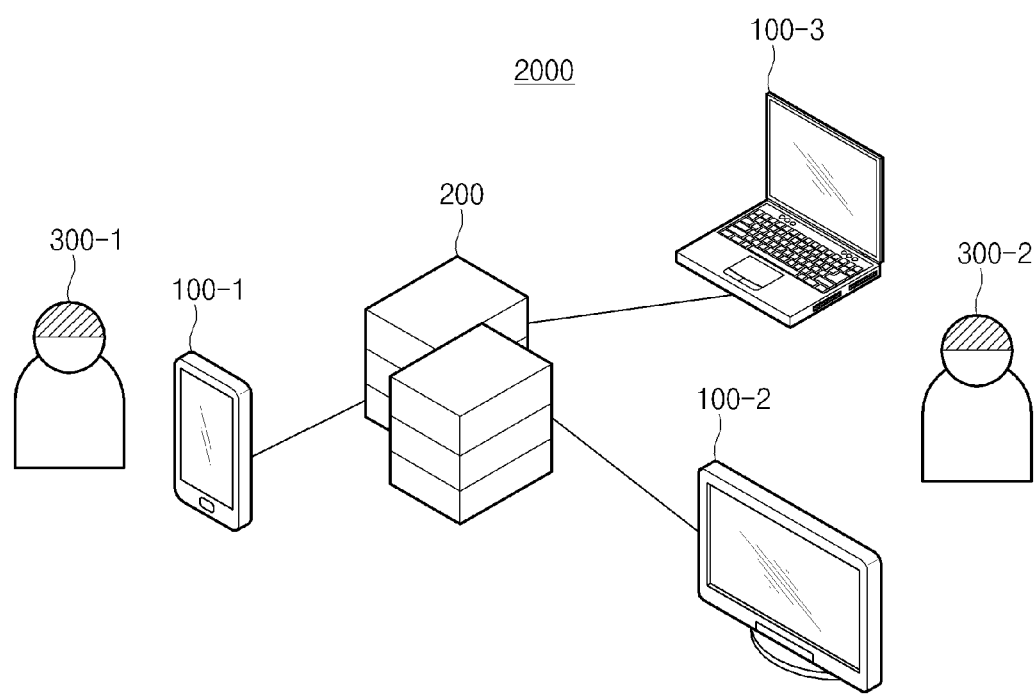
FIG. 18 is a schematic view of an instant message transmitting/receiving system according to another embodiment of the present invention.

FIG. 18 is a schematic view of an instant message transmitting/receiving system according to another embodiment of the present invention. In particular, FIG. 18 illustrates the case where the same user uses an instant message service with one account using two terminal devices.

Referring to FIG. 18, an instant message transmitting/receiving system 2000 according to another embodiment of the present invention includes a plurality of terminal devices 100-1, 100-2, and 100-3 and a server 200. Each of the terminals devices 100-1 to 100-3 and the server may be connected to each other through a communication network. The system of FIG. 18 is different from that of FIG. 1 in that the plurality of terminal devices 100-1 to 100-3 transmit/receive instant messages to/from each other through the server 200. A first user 300-1 is a user of the first terminal device 100-1, and a second user 300-2 is a user of the second and third terminal devices 100-2 and 100-3. The second user 300-2 may access two terminals using one account.

The server 200 stores instant messages transmitted/received between the plurality of terminal devices 100-1 and 100-2. In detail, the server 200 may store mapping information obtained by mapping the content of the instant message to the display identification information. The server 200 may also map and store the message identification information. Furthermore, when the cancellation message or the restoration message is received from the plurality of terminal devices 100-1 and 100-2, the server 200 may update the display identification information on the instant message with the message cancellation information or the message display information included in the header of the cancellation message or the restoration message.

The server 200 may store the mapping information of the instant message for each user account. In other words, the server 200 may store the mapping information of each of the first user 300-1 and the second user 300-2. To this end, the header of the instant message may include user account information for identifying a user account, and the server 200 may store instant messages for each user account using the user account information included in the instant messages. When the second user 300-2 transmits/receives an instant message from/to the first user 300-1 using the second terminal devices 100-2 and then accesses the server with the same user account using the third terminal device 100-3, the third terminal device 100-3 may request information on a previous instant message from the server 200 and may receive the information. Therefore, the user may use the instant message service in multiple terminal devices through one account.

The configuration and structure of the terminal device 100 included in the instant message transmitting/receiving system according to another embodiment of the present invention similar to those illustrated in FIGS. 3 and 5. Therefore, the differences therebetween will be described in detail with reference to FIGS. 3 and 5.

The message generation unit 110 may insert the user account information into the header of the instant message when generating the instant message. To this end, the instant message may include a field in the header so that the user account information is inserted thereto.

The communication unit 120 may transmit the instant message, the cancellation message, and the restoration message to the server 200 other than the other terminal device, and may receive the instant message, the cancellation message, and the restoration message transmitted from the other terminal device via the server 200.

When the user of the terminal device 100 logs into the user account, the communication unit 120 may request the mapping information on the user account from the server 200, and may receive the mapping information therefrom. When the mapping information is received from the server 200, the storage unit 140 may update the prestored mapping information with the mapping information received from the server 200.

Figure 19:
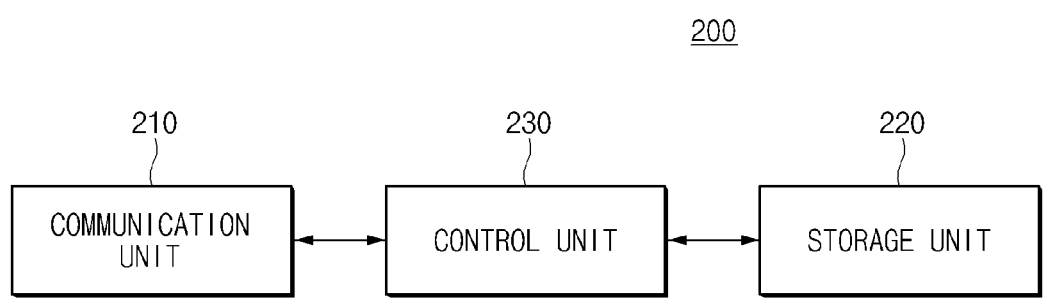
FIG. 19 is a block diagram illustrating a particular configuration of a server according to an embodiment of the present invention.

FIG. 19 is a block diagram illustrating a configuration of the server 200 according to an embodiment of the present invention.

Referring to FIG. 19, the server 200 includes a communication unit 210, a storage unit 220, and a control unit 230.

The communication unit 210 may receive the instant message, the cancellation message, or the restoration message from the first terminal device to transmit the instant message, the cancellation message, or the restoration message to the second terminal device. The display identification information for identifying whether to display the instant message may be inserted thereto. The user account information may be included in the header of the instant message.

The storage unit 220 can be controlled to map the contents of the instant message and the display identification information received from the terminal device 100 to store the content and the display identification information. Furthermore, the storage unit 220 may be controlled to map and store the message identification information or information on a control authority together with the content of the instant message and the display identification information. Furthermore, when the cancellation message or the restoration message is received from the terminal device 100, the storage unit 220 may update the display identification information on the instant message with the message cancellation information or the message display information included in the header of the cancellation message or the restoration message. The information stored in the storage unit is similar to that described above with reference to FIGS. 6 and 14, and thus a detailed description of the information stored in the storage unit will be omitted.

The control unit 230 controls overall operation of the server 200. In particular, the control unit 230 may control the storage unit 220 so that the mapping information is stored for each user account using the user account information inserted into the header of the instant message. The control unit 230 may control the storage unit 220 so that the mapping information stored in the storage unit 220 is transmitted to the terminal device 100 when the terminal device 100 requests the mapping information on the user account.

The above-described methods for controlling terminal devices according to various embodiments of the present invention may be implemented with an executable program. This program may be stored in various types of recording media.

While terms including ordinal numbers, such as "first" and "second," etc., may be used to describe various components, such components are not limited by the above terms. The above terms are used only to distinguish one component from another. For example, a first component may be referred to as a second component without departing from the scope of the present invention, and likewise a second component may be referred to as a first component. The term of and/or includes a combination of a plurality of items or one of the plurality of items.

The terms used herein are merely used to aide in an understanding of the illustrative descriptions herein, and are not intended to limit the present invention to the illustrative descriptions herein. An expression used in the singular encompasses the expression of the plural, unless it has a clearly different meaning in the context. The use of "including," "comprising," or "having" and variations thereof herein is meant to encompass the characteristics, numbers, s, operations, elements, component parts or combinations thereof listed thereafter and equivalents thereof as well as additional items, not excluding one or more different characteristics, numbers, steps, operations, elements, component parts or combinations thereof.

The above-described methods according to the present disclosure can be implemented in hardware, firmware or as software or computer code that is stored on a non-transitory machine readable medium such as a CD ROM, a RAM, a floppy disk, a hard disk, or a magneto-optical disk or computer code downloaded over a network originally stored on a remote recording medium or a non-transitory machine readable medium and stored on a local non-transitory recording medium, so that the methods described herein are loaded into hardware such as a general purpose computer, or a special processor or in programmable or dedicated hardware, such as an ASIC or FPGA. As would be understood in the art, the computer, the processor, microprocessor controller, or the programmable hardware contain circuitry that may be integrated, and can include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

In addition, an artisan understands and appreciates that a "controller", "processor" or "microprocessor" constitute hardware in the claimed invention. Under the broadest reasonable interpretation, the appended claims constitute statutory subject matter in compliance with 35 U.S.C. §101 and none of the elements constitute of software per se.

The terms "unit" or "module" as may be used herein is to be understood as constituting or operating in conjunction with hardware such as a circuit, integrated circuit, processor or microprocessor configured for a certain desired functionality in accordance with statutory subject matter under 35 U.S.C. §101, and such terms do not constitute software per se.

In detail, a program code for performing the above-described methods may be stored in various nonvolatile recording media such as a flash memory, a read only memory (ROM), an erasable programmable ROM (EPROM), an electronically erasable and programmable ROM (EEPROM), a hard disk, a removable disk, a memory card, a USB memory, and a CD-ROM.

According to the various embodiments of the present invention, an instant message that has already been transmitted from a sender to a receiver may be cancelled when the sender and the receiver communicate with each other using instant messages, and a cancelled message may be restored.

The above embodiments of the present invention are illustrative and not limitative. Various alternatives and equivalents are possible. Other additions, subtractions, or modifications are obvious in view of the present disclosure and are intended to fall within the scope of the appended claims.

What is claimed is:

1. A terminal device comprising:
a message generation unit configured to generate an instant message in response to a user command; and
a communication unit configured to transmit the instant message to another terminal device,
wherein a header of the instant message includes a field which is inserted to provide display identification information indicating whether to display the instant message, and
wherein, when a cancellation command for a previously transmitted instant message is input from a user, the message generation unit inserts message cancellation information into the header field.

2. The terminal device according to claim 1, wherein the instant message includes in the header information other than a content of the instant message.

3. A terminal device comprising:
a message generation unit configured to generate an instant message in response to a user command; and
a communication unit configured to transmit the instant message to another terminal device,
wherein a header of the instant message includes a field which is inserted to provide display identification information indicating whether to display the instant message, and
wherein, when a restoration command for the instant message for which a cancellation command has been input is received from a user, the message generation unit inserts message display information into the header field.

4. The terminal device according to claim 1, further comprising a storage unit configured to map content of the instant message to the display identification information to store the content of the instant message and the display identification information.

5. The terminal device according to claim 4, further comprising a display unit configured to display the stored content of the instant message on a display screen according to the stored display identification information.

6. The terminal device according to claim 4, wherein the storage unit is configured to map the content of the instant message, the display identification information, and a control authority on the instant message to each other to store the content of the instant message, the display identification information, and the control authority.

7. The terminal device according to claim 6, further comprising a control unit configured to limit input of a cancellation command or a restoration command for the instant message according to the control authority on the instant message.

8. A method for controlling a terminal device, the method comprising:
generating by a message generation unit an instant message having a header including display identification information indicating whether to display the instant message on a display screen;
transmitting by a communication unit the instant message to another terminal device;
displaying by a display unit a content of the instant message on the display screen according to the display identification information; and
deleting, from the display screen, the content of the instant message and displaying an object indicating that the instant message has been cancelled when a cancellation command for the instant message is received at an input unit.

9. A method for controlling a terminal device, the method comprising:
generating by a message generation unit an instant message having a header including display identification information indicating whether to display the instant message on a display screen; and
transmitting by a communication unit the instant message to another terminal device;
displaying by a display unit a content of the instant message on the display screen according to the display identification information;
deleting, from the display screen, the content of the instant message and displaying an object indicating that the instant message is being requested to be cancelled when a cancellation command for the instant message is received; and
deleting, from the display screen, the object when response information indicating message cancellation is received from said another terminal device.

10. The method according to claim 8, further comprising:
limiting input of the cancellation command for the instant message when an event occurs, wherein the event includes at least one of a lapse of a preset time after transmitting the instant message and a lapse of the preset time after a user of the other terminal device checks the instant message.

11. The method according to claim 10, further comprising:
continuous changing of visual indication of at least one of a shape, color, and transparency of the instant message displayed on the display screen until the event occurs.

12. A method for controlling a terminal device, the method comprising:
generating by a message generation unit an instant message having a header including display identification information indicating whether to display the instant message on a display screen;

transmitting by a communication unit the instant message to another terminal device;

receiving, from said another terminal device, an instant message having a header field into which display identification information is inserted; and displaying a content of the instant message on a display screen according to the display identification information in the head field.

13. The method according to claim 12 further comprising:

displaying an object indicating that the instant message has been cancelled, when a cancellation message for the received instant message is received from said another terminal device.

14. The method according to claim 8, further comprising:

limiting input of a user command for at least one of copying, amending, forwarding, and deleting of the received instant message until an event occurs, wherein the event includes at least one of a lapse of a preset time after transmitting the instant message from said another terminal device and a lapse of the preset time after a user checks the instant message.

15. The method according to claim 14, further comprising:

continuous changing of visual indication of at least one of a shape, color, and transparency of the instant message displayed on the display screen until the event occurs.

16. A method for controlling a terminal device, the method comprising:

generating by a message generation unit an instant message having a header including display identification information indicating whether to display the instant message on a display screen;

transmitting by a communication unit the instant message to another terminal device;

receiving, from said another terminal device, an instant message having a header into which display identification information is inserted;

mapping a content of the received instant message to the display identification information;

storing the content of the received instant message and the display identification information; and displaying the stored content of the instant message on the display screen according to the stored display identification information.

17. The method according to claim 16, further comprising:

updating, when a cancellation message or a restoration message for the received instant message is received from the other terminal device, the stored display identification information with display identification information inserted into the header of the respective cancellation message or the restoration message.

18. An instant message transmitting/receiving system comprising:

a first terminal device configured to generate an instant message and transmit the instant message to a second terminal device, the instant message having a header including a field to provide display identification information indicating whether to display the instant message on a display screen; and the second terminal device configured to receive from the first terminal device, the instant message and display a content of the instant message on the display screen according to the display identification information, wherein, when a cancellation command for a previously transmitted instant message is input from a user, the first terminal device inserts message cancellation information into the header field.

* * * * *